United States Patent
Leong et al.

(10) Patent No.: US 10,942,135 B2
(45) Date of Patent: Mar. 9, 2021

(54) RADIAL POLARIZER FOR PARTICLE DETECTION

(71) Applicant: KLA Corporation, Milpitas, CA (US)

(72) Inventors: Jenn-Kuen Leong, San Jose, CA (US); Daniel Kavaldjiev, San Jose, CA (US); Guoheng Zhao, Palo Alto, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/577,089

(22) Filed: Sep. 20, 2019

(65) Prior Publication Data
US 2020/0150054 A1    May 14, 2020

Related U.S. Application Data

(60) Provisional application No. 62/767,246, filed on Nov. 14, 2018.

(51) Int. Cl.
*G01N 21/88* (2006.01)
*G01N 21/21* (2006.01)
(Continued)

(52) U.S. Cl.
CPC ......... *G01N 21/9501* (2013.01); *G01N 21/21* (2013.01); *G01N 21/8806* (2013.01);
(Continued)

(58) Field of Classification Search
CPC ........... G01N 21/8806; G01N 21/9501; G01N 21/95607; G01N 21/21; G01N 2021/882; G01N 21/956; G01N 21/9563; G01N 2015/1454; G01N 15/14; G01N 15/1434; G01N 2021/8822; G01N 2021/8848;
(Continued)

(56) References Cited

U.S. PATENT DOCUMENTS

| | | |
|---|---|---|
| 3,758,201 A | 9/1973 | MacNeille |
| 5,414,510 A | 5/1995 | Schultz et al. |

(Continued)

FOREIGN PATENT DOCUMENTS

| | | |
|---|---|---|
| JP | 2000155099 A | 6/2000 |
| JP | 2010192914 A | 9/2010 |

(Continued)

OTHER PUBLICATIONS

Jenoptik. Liquid Crystal Spatial Light Modulators description. http://www.jenoptik.com/en-liquid-crystal-spatial-light-modulators.

(Continued)

*Primary Examiner* — Christina A Riddle
(74) *Attorney, Agent, or Firm* — Suiter Swantz pc llo

(57) ABSTRACT

A dark field inspection system may include an illumination source to generate an illumination beam, one or more illumination optics to direct the illumination beam to a sample at an off-axis angle along an illumination direction, a detector, one or more collection optics to generate a dark-field image of the sample on the detector based on light collected from the sample in response to the illumination beam, and a radial polarizer located at a pupil plane of the one or more collection optics, where the radial polarizer rejects light with radial polarization with respect to an apex point in the pupil plane corresponding to specular reflection of the illumination beam from the sample.

27 Claims, 10 Drawing Sheets

(51) Int. Cl.
*G01N 21/95* (2006.01)
*G01N 21/956* (2006.01)
*G01N 21/94* (2006.01)

(52) U.S. Cl.
CPC ....... *G01N 21/94* (2013.01); *G01N 21/95607* (2013.01); *G01N 2021/8822* (2013.01); *G01N 2021/8848* (2013.01)

(58) Field of Classification Search
CPC ...... G01N 21/94; G01B 11/30; G01B 11/303; G01B 11/306
USPC .......... 356/237.1–237.6, 429, 430, 600–613, 356/364–370, 335–336
See application file for complete search history.

(56) References Cited

U.S. PATENT DOCUMENTS

| | | | |
|---|---|---|---|
| 5,426,506 A | | 6/1995 | Ellingson et al. |
| 5,635,829 A | | 6/1997 | Hamada |
| 5,740,147 A | * | 4/1998 | Kase .................... G11B 7/1365 369/110.04 |
| 6,034,776 A | | 3/2000 | Germer et al. |
| 6,072,628 A | | 6/2000 | Sarayeddine |
| 6,320,699 B1 | | 11/2001 | Maeda et al. |
| 7,728,965 B2 | * | 6/2010 | Haller ................ G01N 21/9503 356/237.1 |
| 8,259,393 B2 | * | 9/2012 | Fiolka .................. G02B 27/286 359/489.15 |
| 8,891,079 B2 | | 11/2014 | Zhao et al. |
| 9,291,575 B2 | | 3/2016 | Zhao et al. |
| 9,891,177 B2 | | 2/2018 | Vazhaeparambil et al. |
| 9,995,850 B2 | | 6/2018 | Maleev et al. |
| 2001/0012154 A1 | | 8/2001 | Schuster |
| 2002/0191288 A1 | | 12/2002 | Gruner et al. |
| 2004/0092045 A1 | | 5/2004 | Bultman et al. |
| 2004/0125373 A1 | | 7/2004 | Oldenbourg et al. |
| 2004/0145734 A1 | * | 7/2004 | Shibata ................ G01N 21/956 356/237.5 |
| 2006/0065820 A1 | | 3/2006 | Nagai |
| 2006/0072807 A1 | | 4/2006 | Bultman et al. |
| 2006/0092398 A1 | | 5/2006 | McCarthy |
| 2006/0203214 A1 | | 9/2006 | Shiraishi |
| 2006/0262236 A1 | | 11/2006 | Abileah |
| 2007/0008511 A1 | | 1/2007 | De Boeij et al. |
| 2008/0007726 A1 | | 1/2008 | Fairley et al. |
| 2008/0144023 A1 | * | 6/2008 | Shibata .................. G01N 21/21 356/237.2 |
| 2008/0198456 A1 | | 8/2008 | Sharp |
| 2009/0015761 A1 | | 1/2009 | Stockham |
| 2009/0059216 A1 | | 3/2009 | Shibata et al. |
| 2009/0115989 A1 | | 5/2009 | Tanaka |
| 2009/0296066 A1 | | 12/2009 | Fiolka |
| 2010/0045957 A1 | | 2/2010 | Fiolka et al. |
| 2010/0118288 A1 | | 5/2010 | Van De Kerkhof et al. |
| 2010/0177293 A1 | | 7/2010 | Fiolka et al. |
| 2011/0007316 A1 | | 1/2011 | De Wit et al. |
| 2011/0228247 A1 | | 9/2011 | Mulder et al. |
| 2012/0092669 A1 | | 4/2012 | Fiolka et al. |
| 2012/0274931 A1 | * | 11/2012 | Otani .................... G01N 21/21 356/237.3 |
| 2013/0039460 A1 | | 2/2013 | Levy et al. |
| 2014/0361152 A1 | * | 12/2014 | Maleev .............. G01N 21/9501 250/225 |
| 2015/0054941 A1 | | 2/2015 | Ogawa |
| 2015/0276623 A1 | * | 10/2015 | Urano .................. G01N 21/956 356/369 |
| 2016/0018340 A1 | | 1/2016 | Otani et al. |
| 2016/0301914 A1 | | 10/2016 | Shechtman et al. |
| 2017/0082425 A1 | * | 3/2017 | Minekawa ............. G01B 11/30 |
| 2017/0276613 A1 | | 9/2017 | Liu et al. |
| 2017/0363547 A1 | | 12/2017 | Otani et al. |
| 2018/0188188 A1 | | 7/2018 | Zhao et al. |
| 2018/0292574 A1 | | 10/2018 | Maleev et al. |

FOREIGN PATENT DOCUMENTS

| | | |
|---|---|---|
| KR | 20180045817 A | 5/2018 |
| TW | 200928603 A | 7/2009 |

OTHER PUBLICATIONS

Tricard, Marc, Paul Dumas, and Joe Menapace. Continuous Phase Plate Polishing Using Magnetorheological Finishing. pp. 1-4. QED Technologies, Rochester, NY, USA and Lawrence Livermore National Laboratories, Livermore, CA, USA.

Menapace, Joseph A., Sham N. Dixit, Francois Y. Genin, and Wayne F. Brocious. Magnetorheological Finishing for Imprinting Continuous Phase Plate Structure onto Optical Surfaces. Laser-Induced Damage in Optical Materials. Downloaded from http://spiedigitallibrary.org on Dec. 14, 2012. pp. 220-230. vol. 5273. Bellingham, WA, USA.

Newport. Properties of Optical Materials. http://www.newport.com/Optical-Materials/144943/1033/content.aspx.

International Search Report dated Jun. 5, 2020 for PCT/US2020/017395.

International Search Report dated Mar. 10, 2020 for PCT/US2019/061059.

* cited by examiner

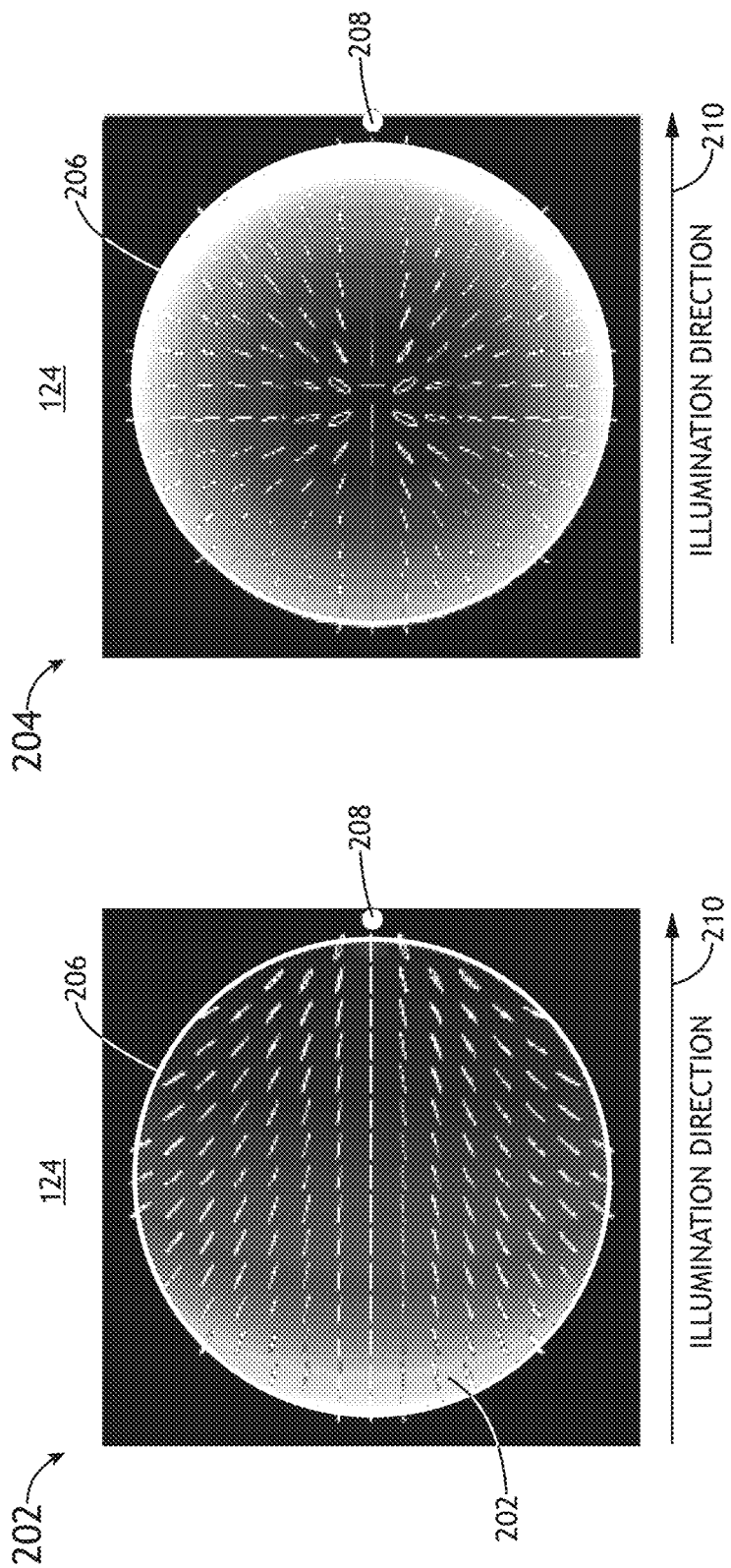

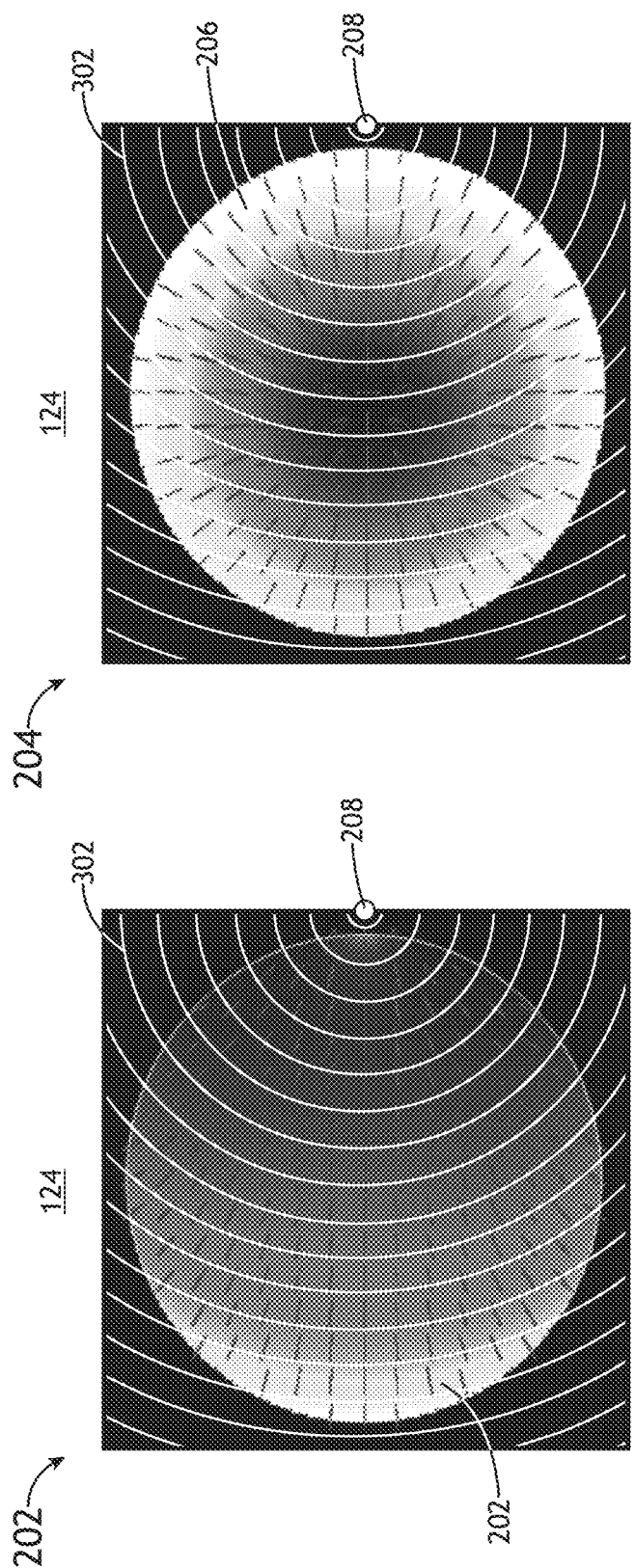

RADIAL POLARIZER FOR PARTICLE DETECTION

CROSS-REFERENCE TO RELATED APPLICATION

The present application claims the benefit under 35 U.S.C. § 119(e) of U.S. Provisional Application Ser. No. 62/767,246, filed Nov. 14, 2018, entitled PARTICLE DETECTION WITH IMPROVED RESOLUTION ON WAFER INSPECTION SYSTEM, naming Jenn-Kuen Leong, Daniel Kavaldjiev, John Fielden, and Guoheng Zhao as inventors, which is incorporated herein by reference in the entirety.

TECHNICAL FIELD

The present disclosure is generally related to particle inspection and, more particularly, to dark-field particle inspection.

BACKGROUND

Particle detection systems are commonly utilized in semiconductor processing lines to identify defects or particulates on wafers such as, but not limited to, unpatterned wafers. As semiconductor devices continue to shrink, particle detection systems require corresponding increases in sensitivity and resolution. A significant source of noise that may limit measurement sensitivity is surface scattering on a wafer, which may be present even for optically polished surfaces. While various methods have been proposed to suppress surface scattering with respect to scattering from particles, such methods may fail to achieve desired sensitivity levels and/or may achieve sensitivity at the expense of degraded image quality. There is therefore a need to develop systems and methods that mitigate the deficiencies addressed above.

SUMMARY

A system is disclosed in accordance with one or more illustrative embodiments of the present disclosure. In one illustrative embodiment, the system includes an illumination source to generate an illumination beam. In another illustrative embodiment, the system includes one or more illumination optics to direct the illumination beam to a sample at an off-axis angle along an illumination direction. In another illustrative embodiment, the system includes a detector. In another illustrative embodiment, the system includes one or more collection optics to generate a dark-field image of the sample on the detector based on light collected from the sample in response to the illumination beam. In another illustrative embodiment, the system includes a radial polarizer located at a pupil plane of the one or more collection optics, where the radial polarizer is configured to reject light with radial polarization with respect to an apex point in the pupil plane corresponding to specular reflection of the illumination beam from the sample.

A system is disclosed in accordance with one or more illustrative embodiments of the present disclosure. In one illustrative embodiment, the system includes an illumination source to generate an illumination beam. In another illustrative embodiment, the system includes one or more illumination optics to direct the illumination beam to a sample at an off-axis angle along an illumination direction. In another illustrative embodiment, the system includes a detector. In another illustrative embodiment, the system includes one or more collection optics to generate a dark-field image of the sample on the detector based on light collected from the sample in response to the illumination beam. In another illustrative embodiment, the system includes a phase mask located at a pupil plane of the one or more collection optics configured to provide different phase shifts for light in two or more regions of a collection area of the pupil plane to reshape a point spread function of light scattered from one or more particles on the sample, where the collection area corresponds to a numerical aperture of the one or more collection optics.

A method is disclosed in accordance with one or more illustrative embodiments of the present disclosure. In one illustrative embodiment, the method includes illuminating a sample with a p-polarized illumination beam at an oblique angle along an illumination direction. In another illustrative embodiment, the method includes collecting light from the sample in response to the illumination beam in a dark-field mode with one or more collection optics. In another illustrative embodiment, the method includes propagating the light from the sample through a radial polarizer located at a pupil plane of the one or more collection optics, wherein the radial polarizer is configured to reject light with radial polarization with respect to an apex point in the pupil plane corresponding to specular reflection of the illumination beam from the sample. In another illustrative embodiment, the method includes propagating the light from the sample through a phase mask located at the pupil plane configured to provide different phase shifts for light in two or more regions of a collection area of the pupil plane to reshape a point spread function of light scattered from one or more particles on the sample, where the collection area corresponds to a numerical aperture of the one or more collection optics. In another illustrative embodiment, the method includes generating a dark-field image of the sample based on light propagating through the radial polarizer and the phase mask in response to the illumination beam, where the dark-field image of the sample is based on light scattered by one or more particles on a surface of the sample.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 2A is a pupil-plane scattering map of surface scattering in response to obliquely-incident p-polarized light, in accordance with one or more embodiments of the present disclosure;

FIG. 2B is a pupil-plane scattering map of light scattered by a small particle in response to obliquely-incident p-polarized light, in accordance with one or more embodiments of the present disclosure;

FIG. 4A is a conceptual view of the haze-rejection polarizer overlaid on the scattering map of FIG. 2A, in accordance with one or more embodiments of the present disclosure;

FIG. 4B is a conceptual view of the haze-rejection polarizer overlaid on the scattering map of FIG. 2B, in accordance with one or more embodiments of the present disclosure;

DETAILED DESCRIPTION

Figure 1:
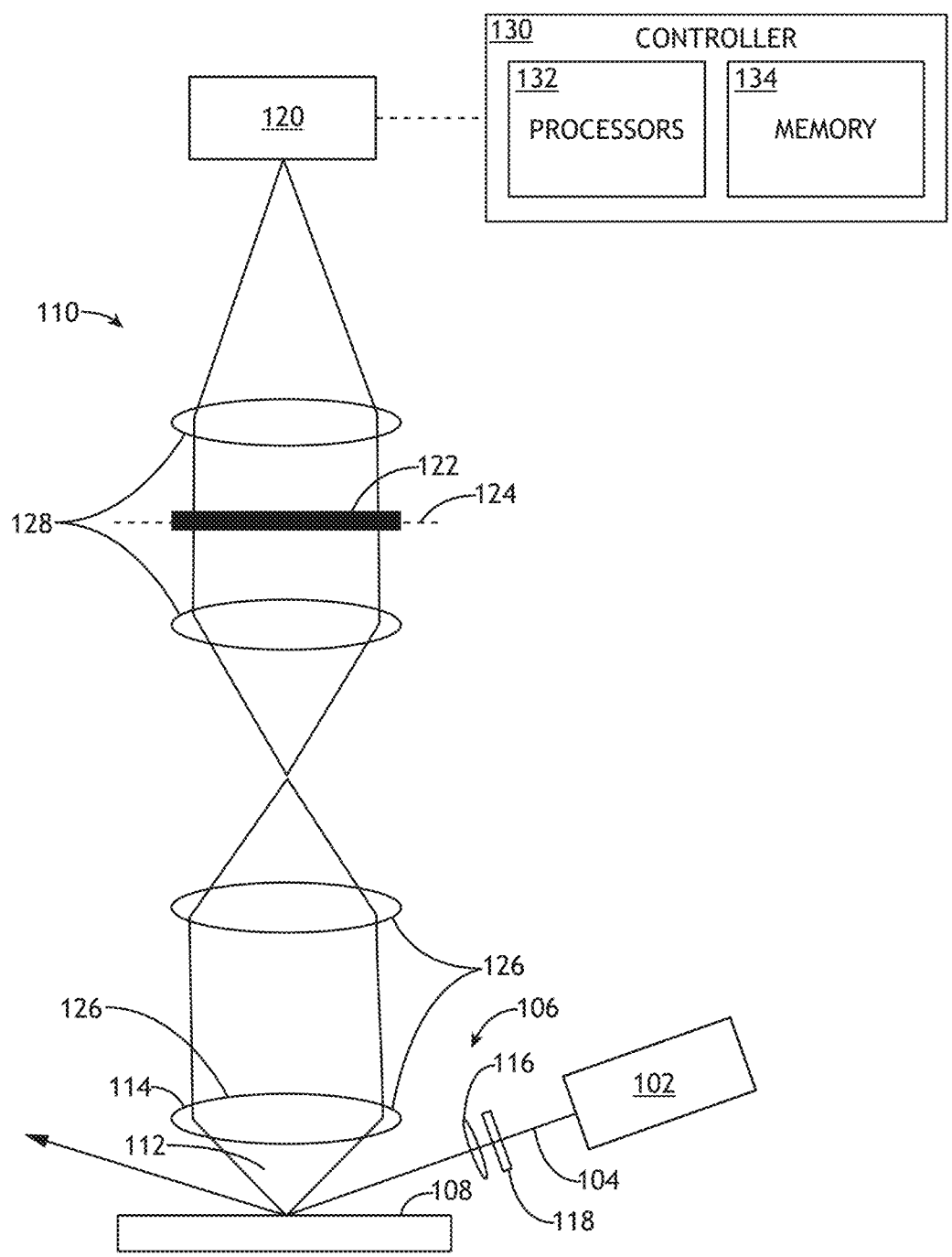
FIG. 1 is a conceptual view of a particle detection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. As used herein, directional terms such as "left", "right", "top", "bottom", "over", "under", "upper", "upward", "lower", "down" and "downward" are intended to provide relative positions for purposes of description, and are not intended to designate an absolute frame of reference. It should be readily apparent to those of ordinary skill in the art that various changes and modifications in form and detail may be made without departing from the spirit and scope of the disclosure.

Embodiments of the present disclosure are directed to systems and methods for particle detection based on dark-field imaging utilizing a haze-rejection polarizer in a pupil plane to selectively filter surface scattering (e.g., surface haze) to facilitate detection of light scattered from particles on a surface. In particular, a haze-rejection polarizer may have spatially-varying rejection directions corresponding to an expected polarization distribution of surface haze across the pupil plane. For the purposes of this disclosure, a particle may include any surface defect on a sample of interest including, but not limited to, a foreign particle, a scratch, a pit, a hole, a bump, or the like.

Scattering or emission angles of light from the sample are mapped to spatial location in the pupil plane. Accordingly, a polarizer placed in the pupil plane may selectively filter light based on the scattering angle and polarization. It is recognized herein that light scattered from a particle and light scattered from a surface may exhibit different electric field distributions (e.g., polarization and field strength) as a function of scattering angle. Further, differences in the electric field distribution (e.g., scattering map) may be particularly significant for obliquely-incident p-polarized light. For example, surface haze from obliquely-incident p-polarized light may be approximately radially polarized with respect to an angle of specular reflection, whereas scattering from a particle may be approximately radially polarized with respect to a surface normal.

In some embodiments, a dark-field particle detection system includes a radial haze-rejection polarizer oriented in the pupil plane such that an apex angle of the radial haze-rejection polarizer is placed at a location associated with specular reflection of the obliquely-incident p-polarized light to selectively reject the surface haze.

Additional embodiments of the present disclosure are directed to reshaping a point spread function (PSF) of light scattered by particles.

An image of an object (e.g., a particle) that is smaller than an imaging resolution (e.g., much smaller than the illumination wavelength) is generally limited by the PSF of the imaging system. However, the specific distribution of the electric field in the pupil plane (e.g., the angle and polarization of collected light) may cause the image of such an object to be larger and/or have a different shape than the system PSF. In particular, a dark-field image of a particle (e.g., an image of a particle formed with scattered or diffracted light) smaller than the imaging resolution when illuminated with oblique p-polarized light may be an annulus that spreads to an area larger than the system PSF, which negatively impacts particle detection sensitivity. This annulus shape and increase in the size of the PSF or imaged spot of a particle may be associated with destructive interference of collected light at a center of the imaged spot on a detector.

In some embodiments, a dark-field particle detection system includes a phase mask at the pupil plane to facilitate constructive interference of collected light at the center of the imaged spot associated with particle scattering. In this regard, the PSF of imaged particles may be tightened and may be closer to the system PSF.

A phase mask may have various configurations suitable for reshaping the PSF of imaged particles. In some embodiments, the phase mask includes a segmented optic to provide different phase shifts for light in different regions of the pupil plane, where at least one segment is formed from a half-wave plate.

Additional embodiments of the present disclosure are directed to a dark-field particle detection system incorporating both a radial haze-rejection polarizer and a phase plate for reshaping the PSF of imaged particles in a pupil plane. Wafer inspection is generally described in U.S. Pat. No. 9,874,526 issued on Jan. 23, 2018, U.S. Pat. No. 9,291,575 issued on Mar. 22, 2016, U.S. Pat. No. 8,891,079 issued on Nov. 18, 2014, and U.S. Pat. No. 9,891,177 issued on Feb. 13, 2018, all of which are incorporated herein in their entirety.

Referring now to FIGS. 1 through 9, systems and methods for sensitive particle detection will be described in greater detail.

FIG. 1 is a conceptual view of a particle detection system 100, in accordance with one or more embodiments of the present disclosure. In one embodiment, the particle detection system 100 includes an illumination source 102 to generate an illumination beam 104, an illumination pathway 106 including one or more illumination optics to direct the illumination beam 104 to a sample 108, and a collection pathway 110 including one or more collection optics to collect light emanating from the sample 108 (e.g., sample light 112). For example, the collection pathway 110 may include an objective lens 114 to collect at least a portion of the sample light 112. The sample light 112 may include any type of light emanating from the sample 108 in response to the illumination beam 104 including, but not limited to, scattered light, reflected light, diffracted light, or luminescence.

The illumination beam 104 may include one or more selected wavelengths of light including, but not limited to, ultraviolet (UV) radiation, visible radiation, or infrared (IR) radiation. For example, the illumination source 102 may provide, but is not required to provide, an illumination beam 104 having wavelengths shorter than approximately 350 nm. By way of another example, the illumination beam 104 may provide wavelengths of approximately 266 nm. By way of another example, the illumination beam 104 may provide wavelengths of approximately 213 nm. It is recognized herein that imaging resolution and light scattering by small particles (e.g., relative to the wavelength of the illumination beam 104) both generally scale with wavelength such that decreasing the wavelength of the illumination beam 104 may generally increase the imaging resolution and scattering signal from the small particles. Accordingly, illumination beam 104 may include short-wavelength light including, but not limited to, extreme ultraviolet (EUV) light, deep ultraviolet (DUV) light, or vacuum ultraviolet (VUV) light.

The illumination source 102 may include any type of light source known in the art. Further, the illumination source 102 may provide an illumination beam 104 having any selected spatial or temporal coherence characteristics. In one embodiment, the illumination source 102 includes one or more laser sources such as, but not limited to, one or more narrowband laser sources, one or more broadband laser sources, one or more supercontinuum laser sources, or one or more white light laser sources. In another embodiment, the illumination source 102 includes a laser-driven light source (LDLS) such as, but not limited to, a laser-sustained plasma (LSP) source. For example, the illumination source 102 may include, but is not limited to, an LSP lamp, an LSP bulb, or an LSP chamber suitable for containing one or more elements that, when excited by a laser source generate a plasma state and emit broadband illumination. In another embodiment, the illumination source 102 includes a lamp source such as, but not limited to, an arc lamp, a discharge lamp, or an electrode-less lamp.

In another embodiment, the illumination source 102 provides a tunable illumination beam 104. For example, the illumination source 102 may include a tunable source of illumination (e.g., one or more tunable lasers, and the like). By way of another example, the illumination source 102 may include a broadband illumination source coupled to any combination of fixed or tunable filters.

The illumination source 102 may further provide an illumination beam 104 having any temporal profile. For example, the illumination beam 104 may have a continuous temporal profile, a modulated temporal profile, a pulsed temporal profile, and the like.

It is recognized herein that the strength of surface haze may depend on multiple factors including, but not limited to, incidence angle or polarization of the illumination beam 104. For example, the strength of surface haze may be relatively high for near-normal angles of incidence and may drop off for higher incidence angles. In one embodiment, the illumination pathway 106 may include one or more illumination optics such as, but not limited to, lenses 116, mirrors, and the like to direct the illumination beam 104 to the sample 108 at an oblique incidence angle to decrease the generation of surface haze. The oblique incidence angle may generally include any selected incidence angle. For example, the incidence angle may be, but is not required to be, greater than 60 degrees with respect to a surface normal.

In another embodiment, the illumination pathway 106 includes one or more illumination beam-conditioning components 118 suitable for modifying and/or conditioning the illumination beam 104. For example, the one or more illumination beam-conditioning components 118 may include, but are not limited to, one or more polarizers, one or more waveplates, one or more filters, one or more beamsplitters, one or more diffusers, one or more homogenizers, one or more apodizers, or one or more beam shapers. In one embodiment, the one or more illumination beam-conditioning components 118 include a polarizer or waveplate oriented to provide a p-polarized illumination beam 104 on the sample 108.

In another embodiment, the particle detection system 100 includes a detector 120 configured to capture at least a portion of the sample light 112 collected by the collection pathway 110. The detector 120 may include any type of optical detector known in the art suitable for measuring illumination received from the sample 108. For example, a detector 120 may include a multi-pixel detector suitable for capturing an image of the sample 108 such as, but not limited to, a charge-coupled device (CCD) detector, a complementary metal-oxide-semiconductor (CMOS) detector, a time-delayed integration (TDI) detector, a photomultiplier tube (PMT) array, an avalanche photodiode (APD) array, or the like. In another embodiment, a detector 120 includes a spectroscopic detector suitable for identifying wavelengths of the sample light 112.

The collection pathway 110 may include any number of beam-conditioning elements 122 to direct and/or modify the sample light 112 including, but not limited to, one or more lenses, one or more filters, one or more apertures, one or more polarizers, or one or more phase plates.

In one embodiment, as illustrated in FIG. 1, the collection pathway 110 includes one or more beam-conditioning elements 122 located at or near a pupil plane 124. For example, as will be discussed in greater detail below, the collection pathway 110 may include beam-conditioning elements 122 such as, but not limited to, a haze-rejection polarizer (e.g., a radial polarizer, or the like) or a phase mask at or near a pupil plane 124. In this regard, the particle detection system 100 may control and adjust selected aspects of the sample light 112 used to generate an image on the detector 120 including, but not limited to, the intensity, phase, and polarization of the sample light 112 as a function of scattering angle and/or position on the sample.

Further, the collection pathway 110 may have any number of pupil planes 124. For example, as illustrated in FIG. 1, the collection pathway 110 may include one or more lenses 126 to generate an image of the pupil plane 124 and one or more lenses 128 to generate an image of the surface of the sample 108 on the detector 120. However, it is recognized herein that a limited number of beam-conditioning elements 122 may be placed at a particular pupil plane 124 or sufficiently near a particular pupil plane 124 to provide a desired effect. Accordingly, for the purposes of the present disclosure, reference to one or more elements at a pupil plane 124 may generally describe one or more elements at or sufficiently close to a pupil plane 124 to produce a desired effect. In some embodiments, though not shown, the collection pathway 110 may include additional lenses to generate one or more additional pupil planes 124 such that any number of beam-conditioning elements 122 may be placed at or near a pupil plane 124.

In another embodiment, the particle detection system 100 includes a controller 130 including one or more processors 132 configured to execute program instructions maintained on a memory medium 134 (e.g., memory). Further, the controller 130 may be communicatively coupled to any components of the particle detection system 100. In this regard, the one or more processors 132 of controller 130 may execute any of the various process steps described throughout the present disclosure. For example, the controller 130 may receive, analyze, and/or process data from the detector 120 (e.g., associated with an image of the sample 108). By way of another example, the controller 130 may control or otherwise direct any components of the particle detection system 100 using control signals.

The one or more processors 132 of a controller 130 may include any processing element known in the art. In this sense, the one or more processors 132 may include any microprocessor-type device configured to execute algorithms and/or instructions. In one embodiment, the one or more processors 132 may consist of a desktop computer, mainframe computer system, workstation, image computer, parallel processor, or any other computer system (e.g., networked computer) configured to execute a program configured to operate the particle detection system 100, as described throughout the present disclosure. It is further recognized that the term "processor" may be broadly defined to encompass any device having one or more processing elements, which execute program instructions from a non-transitory memory medium 134. Further, the steps described throughout the present disclosure may be carried out by a single controller 130 or, alternatively, multiple controllers. Additionally, the controller 130 may include one or more controllers housed in a common housing or within multiple housings. In this way, any controller or combination of controllers may be separately packaged as a module suitable for integration into particle detection system 100.

The memory medium 134 may include any storage medium known in the art suitable for storing program instructions executable by the associated one or more processors 132. For example, the memory medium 134 may include a non-transitory memory medium. By way of another example, the memory medium 134 may include, but is not limited to, a read-only memory (ROM), a random-access memory (RAM), a magnetic or optical memory device (e.g., disk), a magnetic tape, a solid-state drive, and the like. It is further noted that memory medium 134 may be housed in a common controller housing with the one or more processors 132. In one embodiment, the memory medium 134 may be located remotely with respect to the physical location of the one or more processors 132 and controller 130. For instance, the one or more processors 132 of controller 130 may access a remote memory (e.g., server), accessible through a network (e.g., internet, intranet, and the like). Therefore, the above description should not be interpreted as a limitation on the present invention but merely an illustration.

It is contemplated herein that the particle detection system 100 may be configured as any type of image-based particle detection system known in the art. In one embodiment, as illustrated in FIG. 1, the particle detection system 100 is a dark-field imaging system to exclude specularly-reflected light. In this regard, the particle detection system 100 may image the sample 108 based primarily on scattered light. Dark-field imaging may further be implemented using any technique known in the art. In one embodiment, an orientation and/or a numerical aperture (NA) of the objective lens 114 may be selected such that the objective lens 114 does not collect specularly-reflected light. For example, as illustrated in FIG. 1, the objective lens 114 is oriented approximately normal to the sample 108 and has an NA that does not include a specularly-reflection portion of the illumination beam 104. Further, the objective lens 114 may have, but is not required to have, an NA of approximately 0.9 or greater. In another embodiment, the particle detection system 100 may include one or more components to block specular reflection from reaching the detector 120.

Referring now to FIGS. 2A through 4B, pupil-plane polarization filtering is described in greater detail.

In one embodiment, the particle detection system 100 includes a haze-rejection polarizer in a pupil plane of the collection pathway 110 (e.g., collection optics) to preferentially reject light scattered from a surface of the sample 108 (e.g., surface haze), which may be considered noise in particle detection applications. In this regard, an image of the sample 108 may primarily be formed from light scattered by one or more particles (or other defects in the surface).

FIG. 2A is a pupil-plane scattering map 202 of surface scattering (e.g., surface haze) in response to obliquely-incident p-polarized light, in accordance with one or more embodiments of the present disclosure. FIG. 2B is a pupil-plane scattering map 204 of light scattered by a small particle (e.g., small relative to an imaging resolution of the particle detection system 100 or a wavelength of the illumination beam 104) in response to obliquely-incident p-polarized light, in accordance with one or more embodiments of the present disclosure.

In particular, the scattering maps 202, 204 include the electric field strength indicated by the shading with white as the highest intensity and black as the lowest intensity. Further, the scattering maps 202, 204 include the polarization orientation of light as a function of collection angle (e.g., scattering angle) in the pupil plane 124 indicated by the overlaid ellipses. The scattering maps 202, 204 are bounded by a collection area 206 in the pupil plane 124, which is associated with the range of angles that sample light 112 is collected by the particle detection system 100. For example, the collection area 206 may correspond to the numerical aperture (NA) of the objective lens 114.

The scattering maps 202, 204 are based on a configuration of the particle detection system 100 illustrated in FIG. 1. Accordingly, the specular reflection angle 208 is located outside of the collection area 206 along the illumination direction 210 (e.g., outside the collection area 206 on the right side of the circular collection area 206 in FIG. 2A).

Additionally, the scattering maps 202, 204 may be representative of scattering from a wide variety of materials including, but not limited to, silicon, epitaxial, and polysilicon wafers. However, it is to be understood that the scattering maps 202, 204 are provided solely for illustrative purposes and should not be interpreted as limiting the present disclosure.

As illustrated in FIGS. 2A and 2B, the electric field distribution (e.g., electric field strength and polarization orientation) of light scattered by a particle may differ substantially from the electric field distribution of light scattered by a surface, particularly when the illumination beam 104 is p-polarized. For example, sample light 112 associated with surface haze generally exhibits an approximately radial polarization distribution with respect to the specular reflection angle 208 in the collection area 206 as illustrated in FIG. 2A. In contrast, sample light 112 associated with particle scattering generally exhibits an approximately radial polarization distribution with respect to the surface normal as illustrated in FIG. 2B. Further, the polarization of the scattered sample light 112 light is generally elliptical. As can be seen from FIGS. 2A and 2B, at most locations in the pupil plane 124, the ellipses are very elongated meaning that one linear polarization component is much stronger than the other. For the sample light 112 scattered from a small particle (e.g., FIG. 2B), the polarization may be more elliptical near the center of the pupil, meaning that the two linear polarization components can be roughly comparable in magnitude. However, the intensity of the light in this region of the pupil is relatively low and contribute little to the total scattering signal from a small particle.

In one embodiment, the particle detection system 100 includes a polarizer located at or near the pupil plane 124 to preferentially reject surface haze. In a general sense, a polarizer located at or near the pupil plane 124 may be designed to provide spatially-varying polarization-filtering corresponding to any known, measured, simulated, or otherwise expected polarization of light. In the context of the present disclosure, a polarizer located at or near the pupil plane 124 may preferentially filter surface haze based on a known electric field distribution in the pupil plane 124. Accordingly, in some embodiments, the particle detection system 100 includes a radial haze-rejection polarizer located at or near the pupil plane 124 to preferentially reject the approximately radially-polarized surface haze illustrated in FIG. 2A.

Figure 3B:
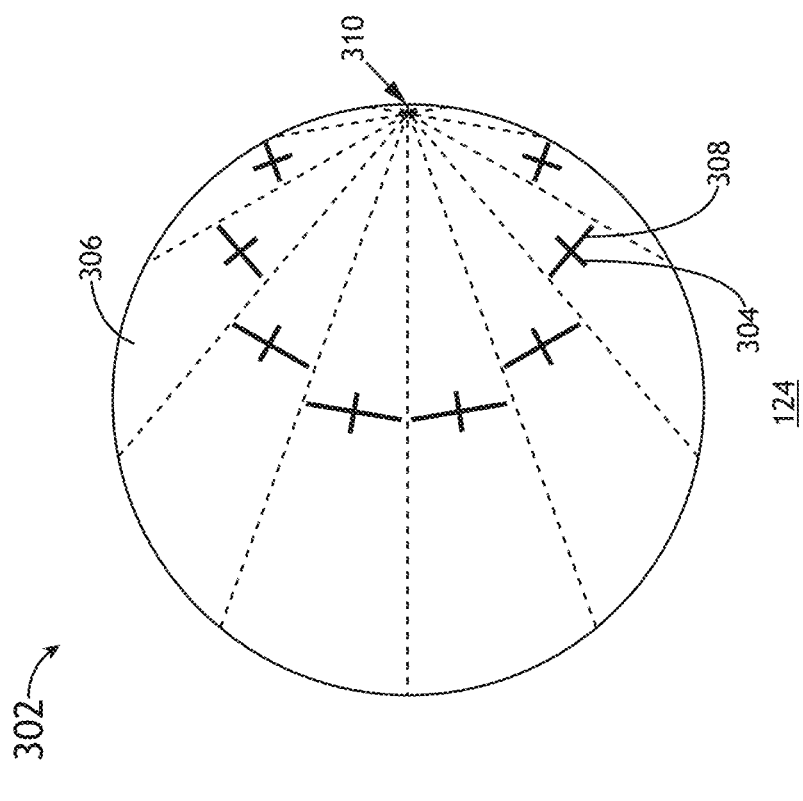
FIG. 3B is a top view of a segmented haze-rejection polarizer, in accordance with one or more embodiments of the present disclosure.
Figure 3A:
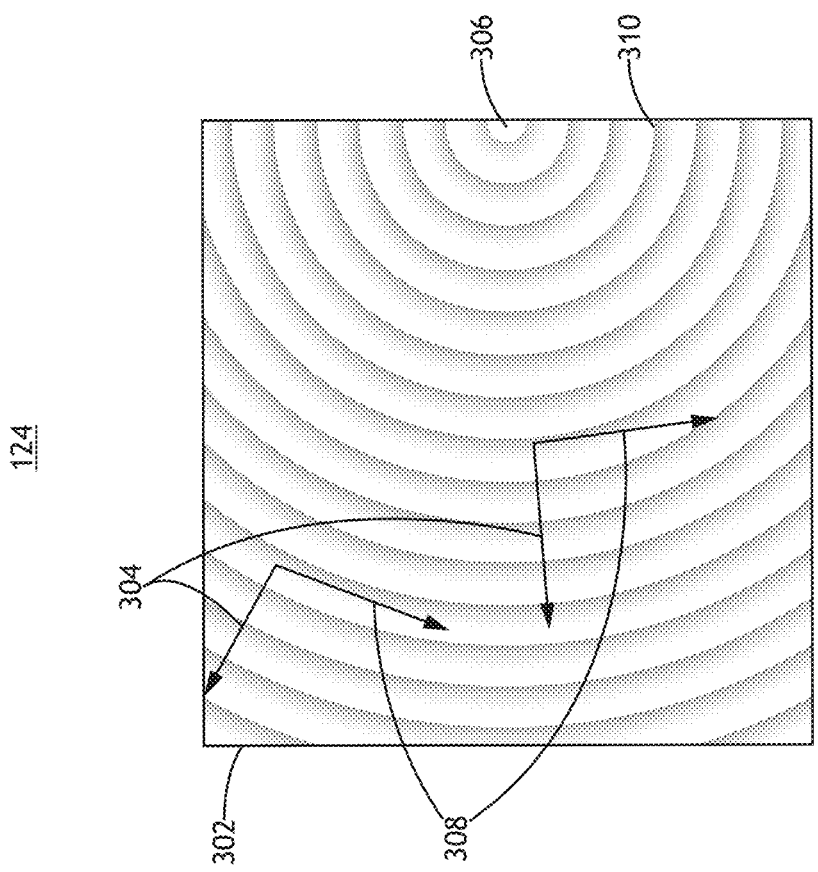
FIG. 3A is a top view of a continuous haze-rejection polarizer, in accordance with one or more embodiments of the present disclosure.

Referring now to FIGS. 3A and 3B, various embodiments of a radial haze-rejection polarizer 302 are described in greater detail. FIG. 3A is a top view of a continuous haze-rejection polarizer 302, in accordance with one or more embodiments of the present disclosure. FIG. 3B is a top view of a segmented haze-rejection polarizer 302, in accordance with one or more embodiments of the present disclosure.

In one embodiment, a radial haze-rejection polarizer 302 has a spatially-varying rejection direction 304 oriented radially with respect to an apex point 306 and a corresponding spatially-varying pass direction 308 oriented tangential to the apex point 306. Accordingly, for any particular point in the pupil plane 124, the radial haze-rejection polarizer 302 may reject (e.g., absorb or reflect) sample light 112 that is radially polarized with respect to the apex point 306 and pass sample light 112 that is tangentially polarized to the apex point 306 (e.g., orthogonal to the radial rejection direction 304).

The apex point 306 may correspond to any point in the plane of the haze-rejection polarizer 302. For example, the apex point 306 may be located on the haze-rejection polarizer 302 as illustrated in FIGS. 3A and 3B. By way of another example, though not shown, the apex point 306 may correspond to a point outside the boundaries 310 of the haze-rejection polarizer 302.

In another embodiment, the haze-rejection polarizer 302 is aligned in the pupil plane 124 such that the apex point 306 coincides with the specular reflection angle 208 (e.g., a reference location in the pupil plane 124 corresponding to the angle of specular reflection from the sample 108).

A radial haze-rejection polarizer 302 may be fabricated using any technique known in the art to achieve radial polarization rejection. For example, as illustrated in FIG. 3A, the haze-rejection polarizer 302 may be formed to have a continuously-varying polarization rejection angle. In this regard, the haze-rejection polarizer 302 illustrated in FIG. 3A may operate as a continuous haze-rejection polarizer 302.

By way of another example, as illustrated in FIG. 3B, the haze-rejection polarizer 302 may be formed from any number of wedge-shaped segments 312 distributed across the pupil plane 124, where each segment 312 is a linear polarizer. For instance, the rejection direction 304 of each segment 312 may be oriented to approximate the continuous radial haze-rejection polarizer 302 in FIG. 3A. A segmented haze-rejection polarizer 302 may have any number of linear polarizers arranged to cover selected angular ranges such as, but not limited to, every 5°, every 10° or every 15°.

A haze-rejection polarizer 302 may be formed from any material known in the art suitable for filtering the illumination beam 104. For example, UV wavelengths may be particularly useful for detecting small particles due to relatively strong scattering of shorter wavelengths by small particles. Accordingly, the haze-rejection polarizer 302 may be fabricated from a material having high transmission at short wavelengths such as, but not limited to alumina, quartz, fused silica, calcium fluoride, or magnesium fluoride.

FIGS. 4A and 4B are conceptual views of the haze-rejection polarizer 302 overlaid on the scattering maps of FIGS. 2A and 2B, respectively, in accordance with one or more embodiments of the present disclosure. As illustrated by FIG. 4A, the polarization of surface haze in the pupil plane 124 is generally radial to the apex point 306 of the haze-rejection polarizer 302 across the pupil plane 124 such that the haze-rejection polarizer 302 substantially rejects the surface haze. In contrast, FIG. 4B illustrates that the polarization of particle scattering is at least partially tangential to the apex point 306 at many locations across the pupil plane 124 such that the haze-rejection polarizer 302 passes a substantial portion of the particle scattering.

It is further recognized herein that although the haze-rejection polarizer 302 may not pass all of the light scattered by small particles, the haze-rejection polarizer 302 may provide a good balance between rejecting unwanted surface haze and passing desired particle scattering to provide a high signal to noise ratio, which may facilitate sensitive particle detection. Further, by passing at least some light for a wide range of scattering angles, polarization-based pupil-plane filtering with the haze-rejection polarizer 302 as described herein may have a limited impact on the system PSF, in contrast to aperture-based filtering techniques. In particular, the system PSF is generally related to the electric field distribution of light in the pupil plane 124 by a Fourier Transform operation such that blocking significant portions of the pupil plane (e.g., with an aperture) may broaden the system PSF and degrade overall performance.

Referring now to FIGS. 5 through 8B, phase masks for shaping or tightening the PSF associated with scattering of p-polarized light by sub-resolution particles are described in greater detail herein.

Figure 5:
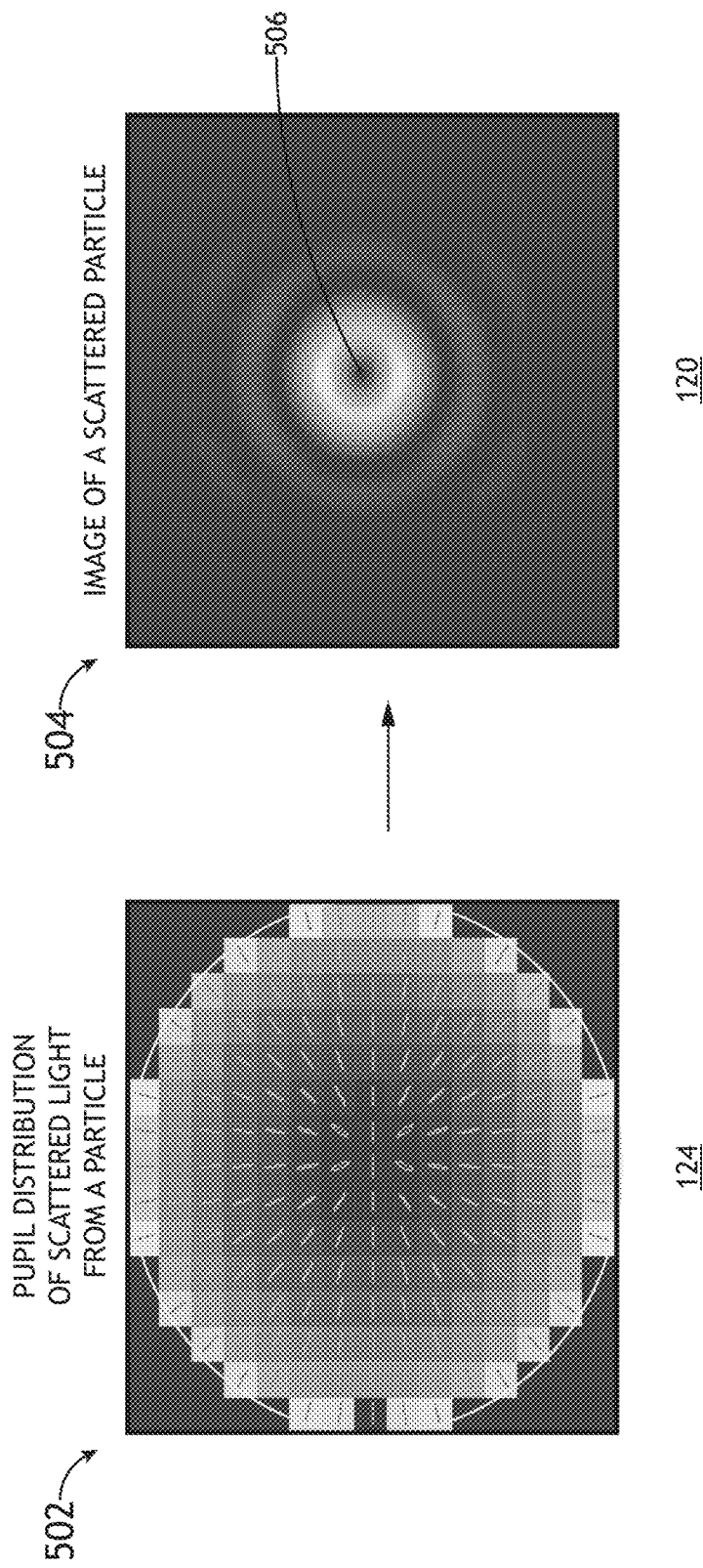
FIG. 5 includes an electric field distribution of p-polarized light by a sub-resolution particle and a corresponding image of the sub-resolution particle, in accordance with one or more embodiments of the present disclosure.

FIG. 5 includes an electric field distribution 502 of p-polarized light by a sub-resolution particle and a corresponding image 504 of the sub-resolution particle, in accordance with one or more embodiments of the present disclosure. As described previously herein, the image of a particle smaller than an imaging resolution of a system is generally limited by the system PSF, which is typically an Airy function when the image is formed from specularly-reflected light. However, the actual PSF associated with a particle (e.g., a particle PSF) and thus the actual image of the particle is related to the particular electric field distribution of light from a particle in the pupil plane 124 and may have a different size or shape than the system PSF, particularly when the image is formed from scattered light.

As illustrated by FIG. 5, the image 504 of a particle based on p-polarized scattered light is annular-shaped rather than an Airy function, which is at least partly a result of the interference pattern associated with the particular polarization distribution of light in the pupil plane 124. In particular, destructive interference at a central point 506 of the image 504 associated with the electric field distribution 502 in FIG. 5A results in deceased intensity at the central point 506 and a radial shifting of the intensity outward. As a result, the signal strength and thus the signal to noise ratio associated with an image of a particle is negatively impacted.

In some embodiments, the particle detection system 100 includes a phase mask located at or near the pupil plane 124 to reshape the PSF of p-polarized light scattered by sub-resolution particles. The phase mask may include any number of components to modify the phase of light based on the location in the pupil plane 124.

For example, the phase mask may include or may be characterized as having two or more segments distributed across the pupil plane 124 such that each segment adjusts the phase of light in a different region of the pupil plane 124. Each segment may then include any type of optical component known in the art including, but not limited to, a phase plate (e.g., birefringent plate, or the like), a compensating plate (e.g., an optically homogenous plate), or an aperture. For instance, a phase plate may include, a waveplate formed from a uniaxial crystal cut with the optic axis oriented perpendicular to the propagation direction through the crystal and any selected thickness to provide any selected phase retardation between orthogonal polarization components (e.g., a π-phase shift for a half-wave plate, a π/2-phase shift for a quarter-wave plate, or the like).

Figure 6A:
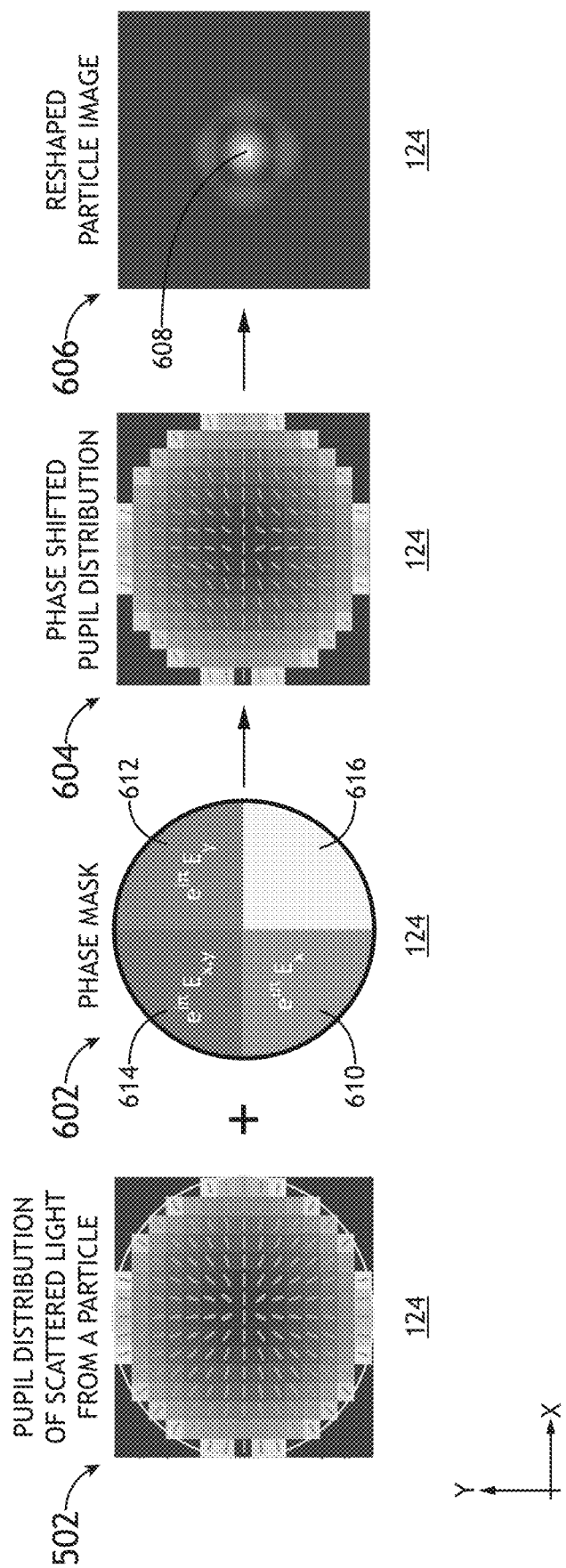
FIG. 6A includes a conceptual top view of a phase mask with four segments to divide the pupil into four regions, the electric field distribution associated with p-polarized light scattered by a sub-resolution particle, a modified electric field distribution based on the phase mask, and the corresponding reshaped image of the particle, in accordance with one or more embodiments of the present disclosure.

FIG. 6A includes a conceptual top view of a phase mask 602 with four segments to divide the pupil into four regions (e.g., quadrants), the electric field distribution 502 associated with p-polarized light scattered by a sub-resolution particle, a modified electric field distribution 604 based on the phase mask 602, and the corresponding reshaped image 606 of the particle, in accordance with one or more embodiments of the present disclosure. In particular, the reshaped image 606 of the particle includes a strong central lobe 608 in contrast to the weak signal in the central point 506 of the image 504 in FIG. 5 generated without the phase mask 602.

In one embodiment, the phase mask 602 includes two overlapping half-wave plates shaped and arranged with the respective optic axes in perpendicular directions. In this regard, each half-wave plate may rotate the polarization of light within the respective region of the pupil plane 124 based on the orientation of the optic axis. For example, as illustrated in FIG. 6A, the phase mask 602 may include a segment 610 formed from a half-wave plate with an optic axis along a Y direction (e.g., perpendicular to the plane of incidence of the illumination beam 104) to introduce a phase shift of π for light polarized along the X direction with respect to orthogonal polarizations (represented as $e^{i\pi}E_x$), and a segment 612 formed from a half-wave plate with an optic axis along an X direction (e.g., parallel to the plane of incidence of the illumination beam 104) to introduce a phase shift of π for light polarized along the y direction with respect to orthogonal polarizations (represented as $e^{i\pi}E_y$). Further, the phase mask 602 may include a segment 614 formed from two overlapping waveplates, one oriented to introduce a phase shift of π for light polarized along the X direction and one oriented to introduce a phase shift of π for light polarized along the Y direction, where the combined effect is represented as $e^{i\pi}E_{x,y}$.

The phase mask 602 may also include a segment 616 that does not rotate the polarization of light. For example, the segment 616 may include a compensating plate formed from an optically homogenous material along the direction of propagation such that light through the segment 616 propagates along the same (or substantially the same) optical path length as light in the other quadrants of the pupil plane 124. In one embodiment, the compensating plate is formed from a material having approximately the same thickness and index of refraction as a half-wave plate in any of the other quadrants of the pupil plane 124, but without birefringence along the propagation direction. In another embodiment, the compensating plate is formed from the same material as the half-wave plates, but cut along a different axis such that light propagating through the compensating plate does not experience birefringence. For instance, light propagating along the optic axis of a uniaxial crystal may not experience birefringence such that the crystal may be optically homogenous for light propagating along the optic axis. By way of another example, the segment 616 may include an aperture.

Further, in some embodiments, a phase mask 602 may be tilted out of the pupil plane 124 to at least partially compensate for optical path length differences between the segment 616 and the other segments (e.g., segments 602-606).

A segmented phase mask 602 may be formed using any technique known in the art. In one embodiment, the various segments (e.g., segments 602-608 of FIG. 6A) are formed as a single component in which the various segments are placed in a single plane.

In another embodiment, the various segments are formed from multiple stacked components such that the combined path through the stacked components provides the desired PSF reshaping. Further, stacked components may be located in the same or different pupil planes 124. For example, the particle detection system 100 may include one or more relay optics to provide multiple conjugate pupil planes. In this regard, various components associated with the phase mask 602 may be distributed between multiple conjugate pupil planes. By way of another example, it may be the case that the components of the phase mask 602 may be fabricated with a thickness of a few millimeters or less. Accordingly, it may be possible to place multiple components close together near a single pupil plane 124. Even though one or more of the components may be displaced slightly from the pupil plane 124 (e.g., by a few mm), they may nonetheless operate to create a strong central lobe 608 in the reshaped image 606.

In one embodiment, the phase mask 602 illustrated in FIG. 6A is formed from a half-wave plate cut into two portions (e.g., two half half-wave plates) rotated with respect to each other. For instance, a half-waveplate may be cut along the optic axis, where a first portion is oriented with the optic axis along the Y direction (e.g., to cover the left half of the collection area 206 in FIG. 6A) and a second portion is oriented with the optic axis along the X direction (e.g., to cover the top half of the collection area 206 in FIG. 6A). Accordingly, the segment 614 may be formed from the two overlapping portions of half-waveplates with crossed optic axes.

Further, since the orientation of the polarization of the scattered sample light 112 from the small particle is substantially symmetrically oriented relative to the center of the pupil (e.g., as illustrated in FIG. 2B), the phase mask 602 may be variously configured with different placements of the waveplates to achieve the reshaped image 606 of the particle including a strong central lobe 608. For example, the half-wave plate depicted in the top portion of the collection area 206 in FIG. 6A may instead be placed in the bottom portion of the collection area 206. Similarly, the half-wave plate depicted in the left portion of the collection area 206 in FIG. 6A may instead be placed in the right portion of the collection area 206.

It is to be understood, however, that FIG. 6A and the associated description are provided solely for illustrative purposes and should not be interpreted as limiting. Rather, the phase mask 602 may include any number of segments formed from any combination of materials in any pattern across the pupil plane 124 so as to reshape the PSF of light scattered from a particle. For example, given a known electric field distribution of light in the pupil plane 124 (e.g., measured, simulated, or the like) associated with an object of interest, a segmented phase mask 602 as described herein may be formed to selectively adjust the phase of various regions of light in the pupil plane 124 to reshape the PSF of an image of the object of interest. In particular, the various segments of the phase mask 602 may be selected to facilitate constructive interference at a detector 120 to provide a tight PSF that approaches the system PSF (e.g., within a selected tolerance).

Figure 6B:
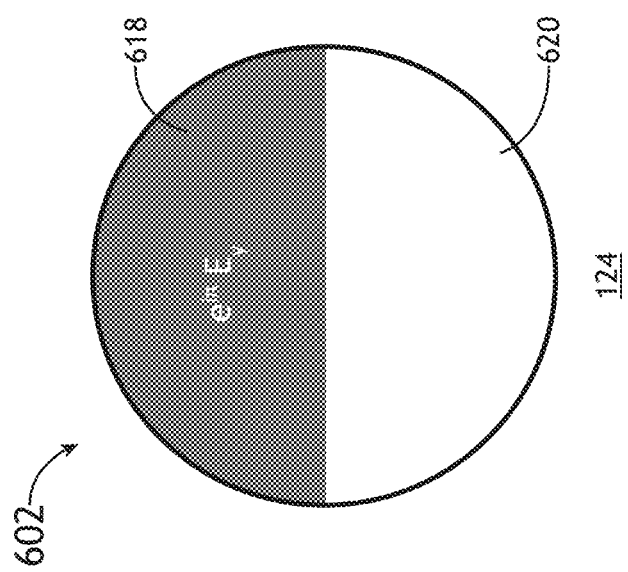
FIG. 6B is a conceptual top view of a phase mask including two segments to divide the pupil into two segments, in accordance with one or more embodiments of the present disclosure.

FIG. 6B is a conceptual top view of a phase mask 602 including two segments to divide the pupil into two segments (e.g., halves), in accordance with one or more embodiments of the present disclosure. For example, as illustrated in FIG. 6B, the phase mask 602 may include a segment 618 formed from a half-wave plate with an optic axis along an X direction to introduce a phase shift of $\pi$ for light polarized along the Y direction with respect to orthogonal polarizations (represented as $e^{i\pi}E_y$). Further, the phase mask 602 may include a segment 620 that does not rotate the polarization of light. For example, the segment 620 may include a compensating plate as described above with respect to FIG. 6A. By way of another example, the segment 620 may include an aperture. Further, as described previously herein, the phase mask 602 may be tilted out of the pupil plane 124 to at least partially compensate for optical path length differences between the segment 618 and the segment 620.

It is to be understood, however, that FIG. 6B and the associated description are provided solely for illustrative purposes and should not be interpreted as limiting. For example, a phase mask 602 with two segments may include a half-wave plate placed in the bottom portion of the collection area 206 rather than the top portion as illustrated in FIG. 6A.

It is further recognized herein that the design of the phase mask 602 may represent a tradeoff between an "ideal" phase mask based on a known electric field distribution associated with particles of interest (e.g., as illustrated in FIG. 2A, or the like) and practical design and/or manufacturing considerations. For example, it may be the case that an ideal or otherwise desired phase mask 602 is unjustifiably expensive or difficult to manufacture. However, it may be the case that certain designs of the phase mask 602 may satisfy both manufacturing and performance specifications (e.g., a particle PSF having a selected shape, or the like). Accordingly, the designs of the phase mask 602 illustrated in FIGS. 6A and 6B may represent two non-limiting examples providing different tradeoffs between performance and manufacturability.

For instance, the design of the phase mask 602 shown in FIG. 6B may be useful in combination with a haze-rejection polarizer 302 such as the one illustrated in FIG. 3. As can be appreciated from FIGS. 4A and 4B, the polarization directions of the sample light 112 scattered from the surface (e.g., surface haze) and from the particle are approximately parallel in the left side of the pupil. A haze-rejection polarizer 302 configured to substantially block the haze may thus also block a significant fraction of the light scattered by a small particle into the left side of the pupil. As a result of this relatively low intensity of the sample light 112 in the left side of the pupil, it may be the case that the phase correction in the left side of the pupil provided by the relatively more complex design of the phase mask 602 shown in FIG. 6A may provide relatively little impact on the PSF for the sample light 112 scattered by a small particle. Accordingly, in some applications, the phase mask 602 shown in FIG. 6B may provide a suitable balance between performance and manufacturability and/or cost considerations.

Figure 7A:
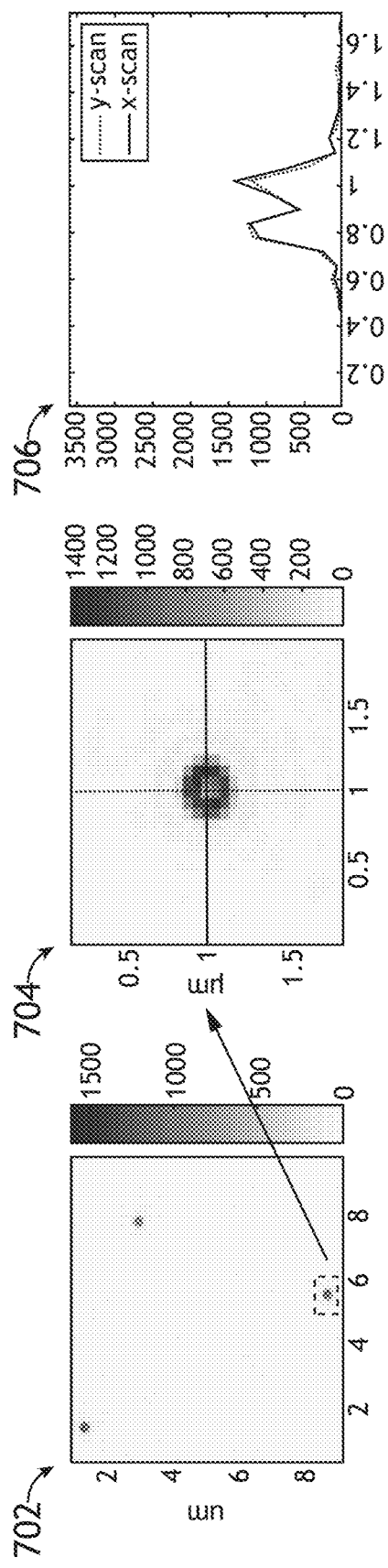
FIG. 7A includes an image of a silicon wafer with sub-40 nm silica particles taken without a phase mask, an inset including an expanded image of one of the particles, and a plot illustrating a cross-section of the expanded image, in accordance with one or more embodiments of the present disclosure.
Figure 7B:
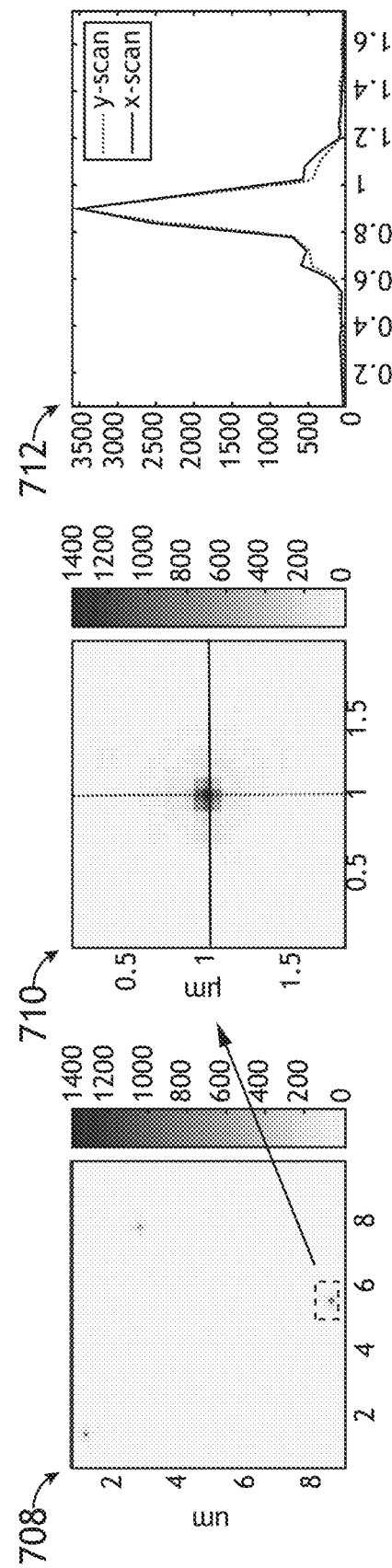
FIG. 7B includes an image of the silicon wafer with sub-40 nm silica particles shown in FIG. 7A taken with a phase mask, an inset including an expanded image of one of the particles, and a plot illustrating a cross-section of the expanded image, in accordance with one or more embodiments of the present disclosure.

Referring now to FIGS. 7A and 7B, experimental measurements illustrating PSF reshaping with a phase mask 602 is described. FIG. 7A includes an image 702 of a silicon wafer with sub-40 nm silica particles taken without a phase mask 602, an inset including an expanded image 704 of one of the particles, and a plot 706 illustrating a cross-section of the expanded image 704, in accordance with one or more embodiments of the present disclosure. FIG. 7B includes an image 708 of the silicon wafer with sub-40 nm silica particles shown in FIG. 7A taken with a phase mask 602, an inset including an expanded image 710 of one of the particles, and a plot 712 illustrating a cross-section of the expanded image 710, in accordance with one or more embodiments of the present disclosure. In particular, the phase mask 602 included two half-wave plates arranged substantially according to the configuration illustrated in FIG. 6A.

As illustrated in FIGS. 7A and 7B, the image of a particle generated without a phase mask 602 as described herein has an annular shape with an intensity dip in the center. However, incorporating the phase mask 602 as described herein tightens the PSF such that an image of a particle has a central peak and a tighter distribution of intensity around the central peak.

In some embodiments, the haze-rejection polarizer 302 and the phase mask 602 may be combined to provide enhanced particle detection sensitivity. Accordingly, the particle detection system 100 may include both the haze-rejection polarizer 302 and the phase mask 602 located in one or more conjugate pupil planes.

Figures 8A, 8B:
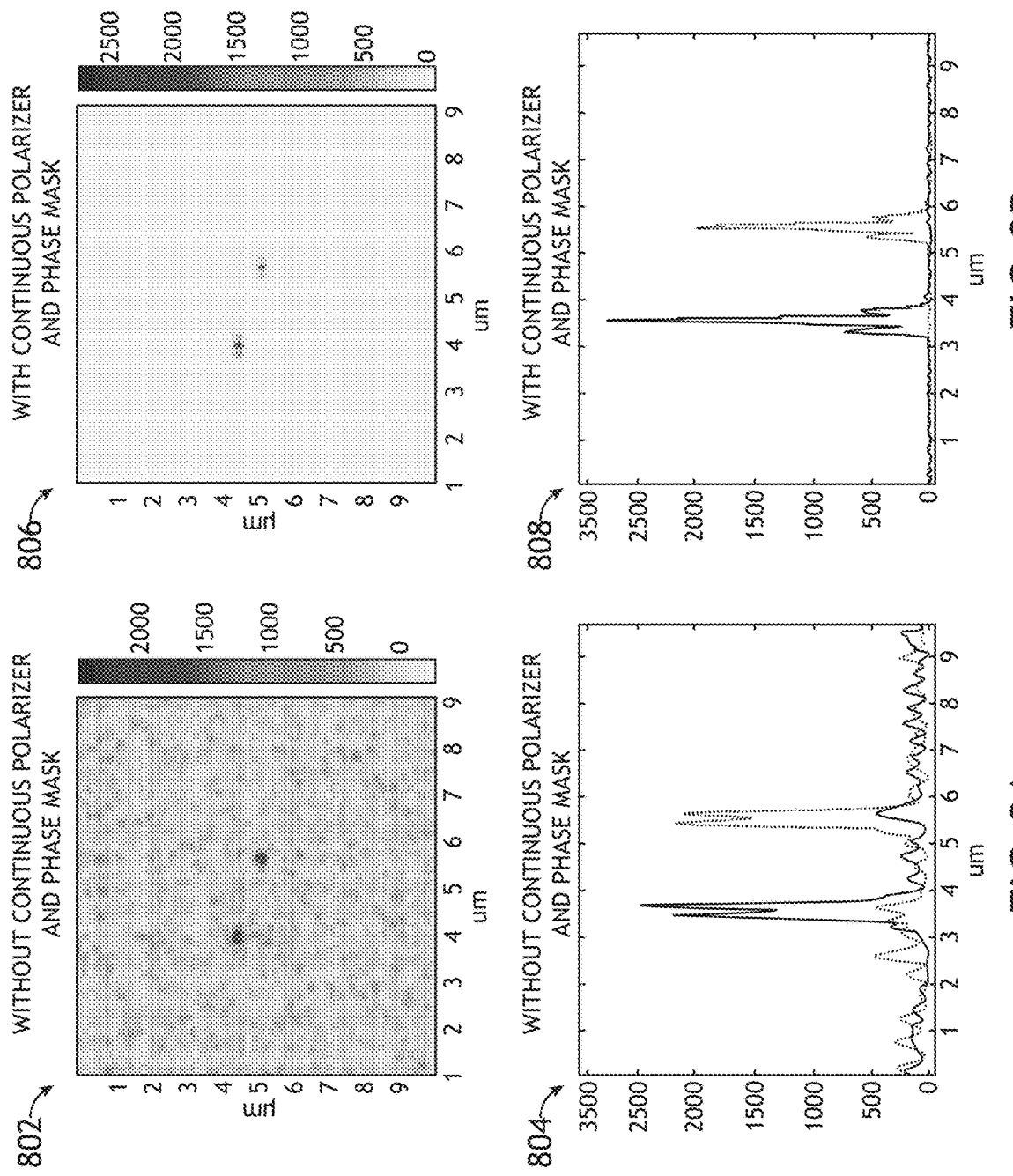
FIG. 8A includes an image of a silicon wafer with sub-40 nm silica particles taken without a haze-rejection polarizer or a phase mask and a plot illustrating a cross-section of the particles, in accordance with one or more embodiments of the present disclosure.
FIG. 8B includes an image of the silicon wafer with sub-40 nm silica particles shown in FIG. 8A taken with both a haze-rejection polarizer and a phase mask, and a plot illustrating a cross-section of the particles, in accordance with one or more embodiments of the present disclosure.

FIG. 8A includes an image 802 of a silicon wafer with sub-40 nm silica particles taken without a haze-rejection polarizer 302 or a phase mask 602 and a plot 804 illustrating a cross-section of the particles, in accordance with one or more embodiments of the present disclosure. FIG. 8B includes an image 806 of the silicon wafer with sub-40 nm silica particles shown in FIG. 8A taken with both a haze-rejection polarizer 302 and a phase mask 602, and a plot 808 illustrating a cross-section of the particles, in accordance with one or more embodiments of the present disclosure. In particular, the phase mask 602 utilized to generate the image 806 is arranged substantially according to the configuration illustrated in FIG. 6B.

As illustrated in FIGS. 8A and 8B, the combination of the haze-rejection polarizer 302 for selectively rejecting surface haze and the phase mask 602 to reshape the PSF of light scattered by particles provides sharp peaks in the image associated with the particles and a high signal to noise ratio for the particles with respect to the surface.

Figure 9:
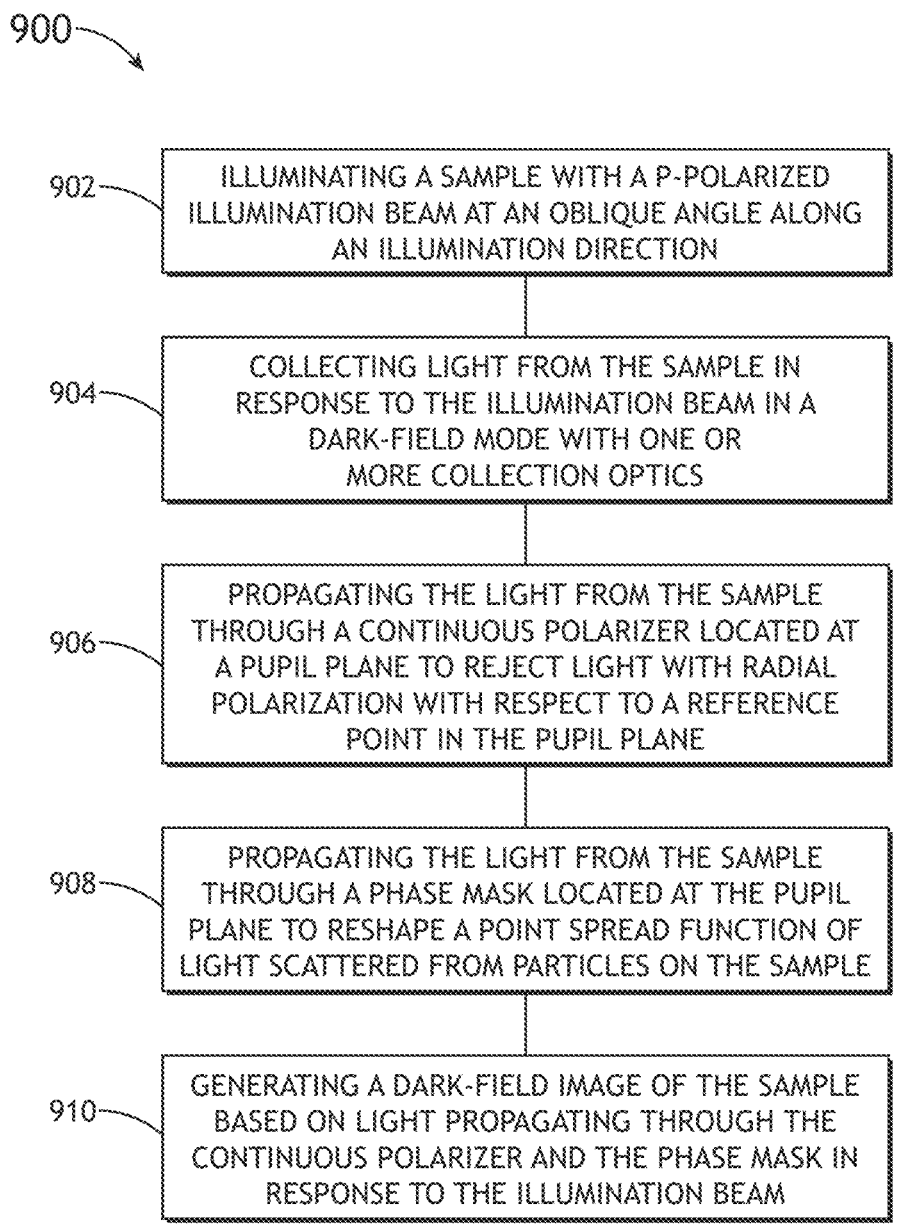
FIG. 9 is a flow diagram illustrating steps performed in a method for particle detection, in accordance with one or more embodiments of the present disclosure.

FIG. 9 is a flow diagram illustrating steps performed in a method 900 for particle detection, in accordance with one or more embodiments of the present disclosure. Applicant notes that the embodiments and enabling technologies described previously herein in the context of the particle detection system 100 should be interpreted to extend to method 900. It is further noted, however, that the method 900 is not limited to the architecture of the particle detection system 100.

In one embodiment, the method 900 includes a step 902 of illuminating a sample with a p-polarized illumination beam at an oblique angle along an illumination direction. In another embodiment, the method 900 includes a step 904 of collecting light from the sample in response to the illumination beam in a dark-field mode with one or more collection optics. In another embodiment, the method 900 includes a step 906 of propagating the light (e.g., via the collection optics) from the sample through a continuous polarizer located at a pupil plane of the one or more collection optics, where the continuous polarizer is configured to reject light with radial polarization with respect to a reference point in the pupil plane corresponding to specular reflection of the illumination beam from the sample (e.g., a specular reflection angle). In another embodiment, the method 900 includes a step 908 of propagating the light from the sample through a phase mask located at the pupil plane configured to provide different phase shifts for light in two or more regions of a collection area of the pupil plane to reshape a point spread function of light scattered from one or more particles on the sample, where the collection area corresponds to a numerical aperture of the one or more collection optics. In another embodiment, the method 900 includes a step 910 of generating a dark-field image of the sample based on light propagating through the continuous polarizer and the phase mask in response to the illumination.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   an illumination source configured to generate an illumination beam;
   one or more illumination optics configured to direct the illumination beam to a sample at an off-axis angle along an illumination direction;
   a detector;
   one or more collection optics configured to generate a dark-field image of the sample on the detector based on light collected from the sample in response to the illumination beam; and
   a radial polarizer located at a pupil plane of the one or more collection optics, wherein the radial polarizer is configured to reject light with radial polarization with respect to an apex point in the pupil plane corresponding to a location of specular reflection of the illumination beam from the sample in the pupil plane.

2. The system of claim 1, wherein the illumination beam is p-polarized at the sample.

3. The system of claim 1, wherein the radial polarizer is oriented to pass light scattered by one or more particles on a surface of the sample.

4. The system of claim 1, wherein the apex point is located outside a collection area associated with light collected by the one or more collection optics.

5. The system of claim 1, wherein the radial polarizer comprises:
   a continuous polarizer having a continuously varying rejection direction to reject the light with the radial polarization with respect to the apex point.

6. The system of claim 1, wherein the radial polarizer comprises:
   a segmented polarizer including a plurality of segments distributed in the pupil plane of the one or more collection optics along a direction perpendicular to the illumination direction, wherein a rejection axis of each segment is oriented to reject light with radial polarization with respect to the apex point in the pupil plane corresponding to specular reflection of the illumination beam from the sample.

7. The system of claim 6, wherein the segmented polarizer comprises:
   an angularly-segmented polarizer, wherein the plurality of segments are radially distributed around the apex point in the pupil plane.

8. The system of claim 1, further comprising:
a phase mask located at the pupil plane of the one or more collection optics configured to provide different phase shifts for light in two or more regions of a collection area of the pupil plane to reshape a point spread function of light scattered from one or more particles on the sample, wherein the collection area corresponds to a numerical aperture of the one or more collection optics.

9. The system of claim 8, wherein the two or more regions of the collection area comprise:
a first half of the collection area and a second half of the collection area divided along the illumination direction.

10. The system of claim 9, wherein a first segment of the phase mask comprises:
a half-wave plate covering the first half of the collection area.

11. The system of claim 10, wherein the half-wave plate is oriented to provide a π phase shift along a direction in the pupil plane corresponding to an angle that is orthogonal to a plane of incidence of the illumination beam on the sample.

12. The system of claim 10, wherein a second segment of the phase mask comprises:
a compensator plate formed from an optically homogenous material along a propagation direction covering the second half of the collection area, wherein an optical path of light through the compensator corresponds to an optical path of light through the half-wave plate within a selected tolerance.

13. The system of claim 10, wherein a second segment of the phase mask comprises:
an aperture covering the second half of the collection area.

14. The system of claim 13, wherein the half-wave plate is tilted to at least partially compensate for optical path differences between light travelling through the first and second halves of the collection area.

15. The system of claim 8, wherein the two or more regions of the collection area comprise:
four quarters of the collection area divided along the illumination direction and a direction orthogonal to the illumination direction.

16. The system of claim 15, wherein the phase mask comprises:
a first half-wave plate covering a first quarter of the collection area and a second quarter of the collection area adjacent to the first quarter, the first half-wave plate oriented to provide a π retardation along a direction in the pupil plane corresponding to an angle in a plane of incidence of the illumination beam on the sample; and
a second half-wave plate covering the second quarter of the collection area and a third quarter of the collection area adjacent to the second quarter, the second half-wave plate oriented to provide a π retardation along a direction in the pupil plane corresponding to an angle orthogonal to the plane of incidence.

17. The system of claim 16, wherein the phase mask further comprises:
a compensator plate formed from an optically homogenous material along a propagation direction covering a fourth quarter of the collection area, wherein an optical path of light through the compensator corresponds to an optical path of light through at least one of the first or second half-wave plates.

18. The system of claim 16, wherein a second segment of the phase mask comprises:
an aperture covering a fourth quarter of the collection area.

19. The system of claim 16, wherein at least one of the first half-wave plate or the second half-wave plate is tilted to at least partially compensate for optical path differences between light travelling through the four quarters of the collection area.

20. A system comprising:
an illumination source configured to generate an illumination beam;
one or more illumination optics configured to direct the illumination beam to a sample at an off-axis angle along an illumination direction;
a detector;
one or more collection optics configured to generate a dark-field image of the sample on the detector based on light collected from the sample in response to the illumination beam; and
a phase mask located at a pupil plane of the one or more collection optics configured to provide different phase shifts for light in two or more regions of a collection area of the pupil plane to reshape a point spread function of light scattered from one or more particles on the sample, wherein the collection area corresponds to a numerical aperture of the one or more collection optics, wherein the phase mask comprises:
a first half-wave plate covering a first quarter of the collection area and a second quarter of the collection area adjacent to the first quarter, the first half-wave plate oriented to provide a π retardation along a direction in the pupil plane corresponding to an angle in a plane of incidence of the illumination beam on the sample; and
a second half-wave plate covering the second quarter of the collection area and a third quarter of the collection area adjacent to the second quarter, the second half-wave plate oriented to provide a π retardation along a direction in the pupil plane corresponding to an angle orthogonal to the plane of incidence.

21. The system of claim 20, wherein the illumination beam is p-polarized at the sample.

22. The system of claim 21, wherein a second segment of the phase mask comprises:
an aperture covering a fourth quarter of the collection area.

23. The system of claim 20, wherein the two or more regions of the collection comprise:
a first half of the collection area and a second half of the collection area divided along the illumination direction.

24. The system of claim 20, wherein an optic axis of the first half-wave plate is oriented along the illumination direction.

25. The system of claim 20, wherein at least one of the first half-wave plate or the second half-wave plate is tilted to at least partially compensate for optical path differences between light travelling through the first and the second half-wave plates.

26. The system of claim 20, wherein the phase mask further comprises:
a compensating plate formed from an optically homogenous material along a propagation direction covering a fourth quarter of the collection area.

27. A method comprising:
illuminating a sample with a p-polarized illumination beam at an oblique angle along an illumination direction;

collecting light from the sample in response to the illumination beam in a dark-field mode with one or more collection optics;

propagating the light from the sample through a radial polarizer located at a pupil plane of the one or more collection optics, wherein the radial polarizer is configured to reject light with radial polarization with respect to an apex point in the pupil plane corresponding to a location of specular reflection of the illumination beam from the sample in the pupil plane;

propagating the light from the sample through a phase mask located at the pupil plane configured to provide different phase shifts for light in two or more regions of a collection area of the pupil plane to reshape a point spread function of light scattered from one or more particles on the sample, wherein the collection area corresponds to a numerical aperture of the one or more collection optics; and generating a dark-field image of the sample based on light propagating through the radial polarizer and the phase mask in response to the illumination beam, wherein the dark-field image of the sample is based on light scattered by one or more particles on a surface of the sample.

* * * * *